(12) United States Patent
Svendsen

(10) Patent No.: US 8,942,718 B2
(45) Date of Patent: Jan. 27, 2015

(54) METHOD AND SYSTEM FOR USING CELLULAR COMMUNICATION DEVICE AVAILABILITY INFORMATION TO PREDICT COVERAGE OVERLAP BETWEEN CALLERS

(75) Inventor: Hugh Svendsen, Chapel Hill, NC (US)

(73) Assignee: Modena Enterprises, LLC, Wilmington, DE (US)

(*) Notice: Subject to any disclaimer, the term of this patent is extended or adjusted under 35 U.S.C. 154(b) by 863 days.

(21) Appl. No.: 12/854,353

(22) Filed: Aug. 11, 2010

(65) Prior Publication Data

US 2012/0064881 A1 Mar. 15, 2012

Related U.S. Application Data

(60) Provisional application No. 61/236,305, filed on Aug. 24, 2009.

(51) Int. Cl.
| | | |
|---|---|---|
| H04W 24/00 | (2009.01) | |
| H04W 4/02 | (2009.01) | |
| H04L 12/58 | (2006.01) | |
| H04L 29/08 | (2006.01) | |

(52) U.S. Cl.
CPC ............. *H04W 4/023* (2013.01); *H04L 51/043* (2013.01); *H04L 51/30* (2013.01); *H04L 67/24* (2013.01); *H04L 67/28* (2013.01); *H04L 51/20* (2013.01); *H04L 51/38* (2013.01); *H04L 67/306* (2013.01)
USPC ...................... 455/456.1; 455/404.2; 455/459

(58) Field of Classification Search
USPC ............................ 455/422.1, 456.1, 517, 459
See application file for complete search history.

(56) References Cited

U.S. PATENT DOCUMENTS

| | | | |
|---|---|---|---|
| 6,317,594 B1 | 11/2001 | Gossman et al. | |
| 6,671,508 B1 | 12/2003 | Mitsuoka et al. | |
| 7,330,721 B2 | 2/2008 | Bhatia et al. | |
| 7,542,558 B2 | 6/2009 | Klein et al. | |
| 7,823,073 B2 * | 10/2010 | Holmes et al. | 455/456.1 |
| 8,195,190 B1 * | 6/2012 | Hou | 455/456.1 |
| 2003/0199269 A1 * | 10/2003 | Tobe et al. | 455/422.1 |
| 2006/0046709 A1 * | 3/2006 | Krumm et al. | 455/422.1 |
| 2006/0046768 A1 | 3/2006 | Kirbas | |

(Continued)

FOREIGN PATENT DOCUMENTS

EP 2159992 A1 * 3/2010

OTHER PUBLICATIONS

"Method and System to Precisely Identify and Notify Callee's Status in Cellular Phone," at <http://priorartdatabase.com/IPCOM/000175628>, Oct. 16, 2008, 3 pages.

(Continued)

*Primary Examiner* — Vladimir Magloire

(57) ABSTRACT

Disclosed herein are methods and systems for determining the availability of a communication device. According to embodiments, a method may include receiving, via a network, first availability information from a first communication device and receiving second availability information from a second communication device. The method further includes determining an estimate of common coverage by comparing the first availability information with the second availability information and transmitting the estimate of common coverage to at least one of the first communication device and the second communication device.

20 Claims, 17 Drawing Sheets

PRESENTING AVAILABILITY INFORMATION IN A
COMMUNICATION DEVICE ADDRESS BOOK

(56) References Cited

U.S. PATENT DOCUMENTS

| | | |
|---|---|---|
| 2008/0125106 A1 | 5/2008 | Lee et al. |
| 2008/0171555 A1* | 7/2008 | Oh et al. .................... 455/456.1 |
| 2008/0242316 A1* | 10/2008 | Wang et al. ................ 455/456.2 |
| 2009/0005064 A1* | 1/2009 | Malik et al. ................ 455/456.1 |
| 2009/0079622 A1* | 3/2009 | Seshadri et al. ........... 342/357.1 |
| 2009/0323604 A1* | 12/2009 | De Jaeger et al. ............ 370/329 |
| 2010/0004005 A1* | 1/2010 | Pereira et al. .............. 455/456.1 |

OTHER PUBLICATIONS

Nakanishi et al., "iCAMS: A Mobile Communication Tool Using Location and Schedule Information," Pervasive computing, published by IEEE CS and IEEE ComSoc, Jan.-Mar. 2004, pp. 82-88, copyright 2004, IEEE, 7 pages.

"Cellity Address book 2.0," Presentation, Mobile Media Summit, Medienforum nrw, Koln, Jun. 24, 2009, cellity AG, Hamburg, Germany, 18 pages.

* cited by examiner

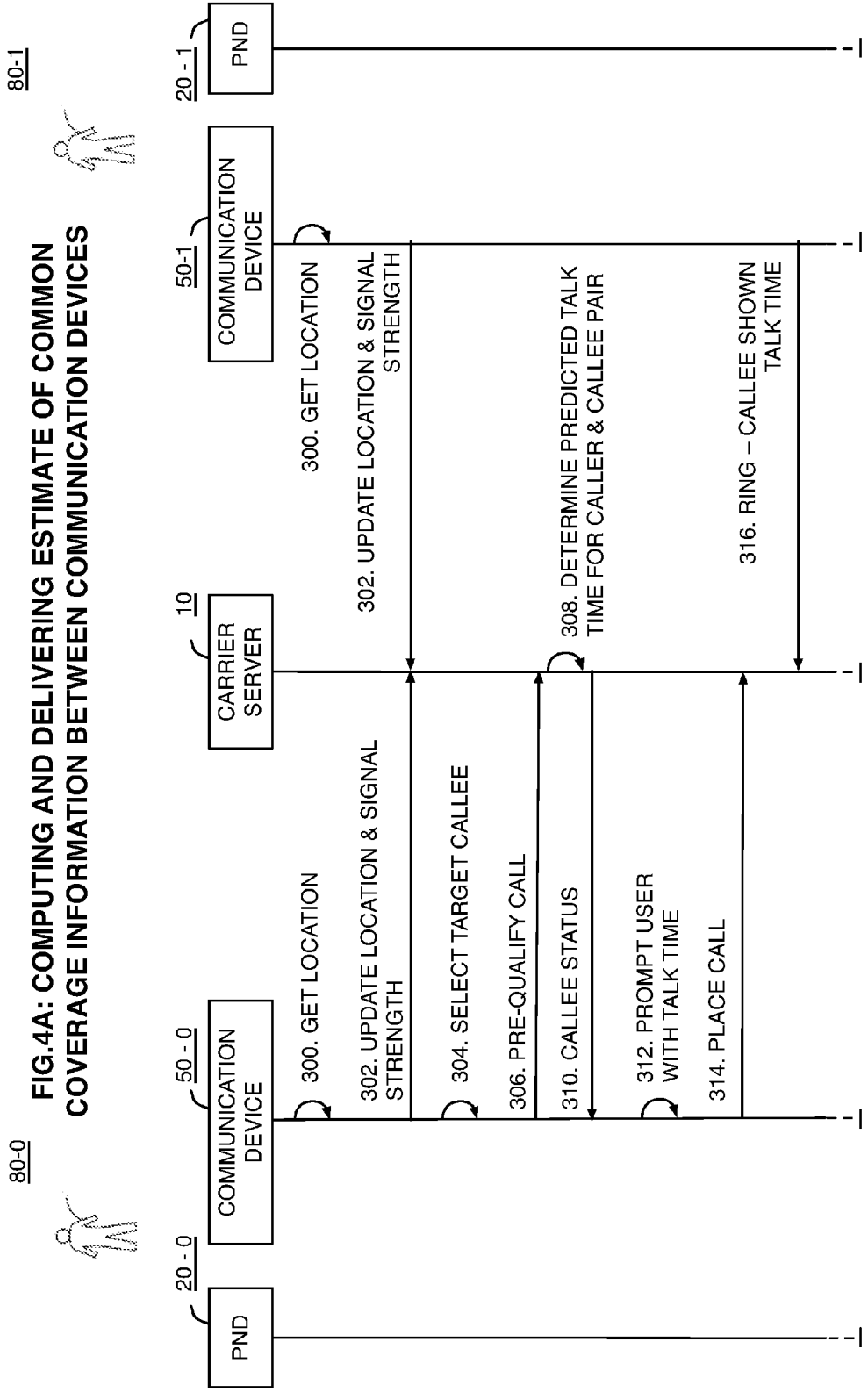

| PREFERENCE PROFILE WEIGHTING COEFFICIENTS (PPWC) | |
|---|---|
| Call Frequency | 0.2 |
| Length Of Calls | 0.3 |
| Time of Day Of Calls | 0.6 |
| Proximity To Caller | 0.1 |
| Ignored Calls | 0.7 |
| Caller Location | 0.8 |
| Caller Speed | 0.3 |
| Social Distance To Caller | 0.2 |
| Profile Proximity to Caller | 0.6 |
| Calendar Entries | 0.5 |
| Favorites | 0.9 |

*FIG. 7A*

| PREFERENCE PROFILE MEASUREMENTS (PPM) | | | | | | |
|---|---|---|---|---|---|---|
| | Cindy | Bobby | Jan | Peter | Marsha | Greg |
| Call Frequency | 0.36 | 0.49 | 0.22 | 0.36 | 0.23 | 0.14 |
| Length Of Calls | 0.35 | 0.69 | 0.73 | 0.67 | 0.81 | 0.85 |
| Time of Day Of Calls | 0.26 | 0.56 | 0.01 | 0.94 | 0.81 | 0.20 |
| Proximity To Caller | 0.28 | 0.34 | 0.66 | 0.32 | 0.61 | 0.24 |
| Ignored Calls | 0.88 | 0.99 | 0.80 | 0.74 | 0.78 | 0.88 |
| Caller Location | 0.86 | 0.02 | 0.55 | 0.21 | 0.79 | 0.97 |
| Caller Speed | 0.91 | 0.67 | 0.70 | 0.34 | 0.26 | 0.41 |
| Social Distance To Caller | 0.04 | 0.51 | 0.87 | 0.45 | 0.05 | 0.15 |
| Profile Proximity to Caller | 0.56 | 0.64 | 0.10 | 0.63 | 0.55 | 0.83 |
| Calendar Entries | 0.72 | 0.00 | 0.40 | 0.34 | 0.51 | 0.67 |
| Favorites | 0.31 | 0.87 | 0.91 | 0.37 | 0.39 | 0.27 |

*FIG. 7B*

| $A^T \times B$ = WEIGHTED PREFERENCE MEASUREMENTS (WPM) | | | | | | |
|---|---|---|---|---|---|---|
| | Cindy | Bobby | Jan | Peter | Marsha | Greg |
| | 2.921 | 2.854 | 2.798 | 2.628 | 3.038 | 3.048 |

*FIG. 7C*

| SORTED ( WPM ) = SORTED WEIGHTED PREFERENCE MEASUREMENTS (SWPM) | | | | | | |
|---|---|---|---|---|---|---|
| | Greg | Marsha | Cindy | Bobby | Jan | Peter |
| | 3.048 | 3.038 | 2.921 | 2.854 | 2.798 | 2.628 |

*FIG. 7D*

| SORTED ( SWPM ) = QUANTIZED SORTED WEIGHTED PREFERENCE MEASUREMENTS (QSWPM) | | | | | | |
|---|---|---|---|---|---|---|
| | Greg | Marsha | Cindy | Bobby | Jan | Peter |
| | 2 | 2 | 1 | 1 | 0 | 0 |

*FIG. 7E*

| F = ALTERNATE ROUTE MATRIX (ARM) | | | | | | |
|---|---|---|---|---|---|---|
| | Greg | Marsha | Cindy | Bobby | Jan | Peter |
| Route A | -35 | 52 | -44 | 96 | 11 | -79 |
| Route B | -28 | -1 | 4 | -80 | 92 | -9 |
| Route C | 13 | 52 | 96 | 87 | -80 | -28 |
| Route D | 96 | -84 | -24 | -40 | 88 | -94 |

| ARM WEIGHTED BY QSWPM = WEIGHTED ALTERNATE ROUTE MATRIX (WARM) | | | | | | |
|---|---|---|---|---|---|---|
| | Greg | Marsha | Cindy | Bobby | Jan | Peter |
| Route A | -70 | 104 | -44 | 96 | 0 | 0 |
| Route B | -56 | -2 | 4 | -80 | 0 | 0 |
| Route C | 26 | 104 | 96 | 87 | 0 | 0 |
| Route D | 192 | -168 | -24 | -40 | 0 | 0 |

*FIG. 7G*

| SUM WARM = SUMMED WEIGHTED ALTERNATE ROUTE MATRIX (SWARM) | |
|---|---|
| Route A | 86 |
| Route B | -134 |
| Route C | 313 |
| Route D | -40 |

*FIG. 7H*

| SORTED SWARM = SORTED SUMMED WEIGHTED ALTERNATE ROUTE MATRIX (SSWARM) | |
|---|---|
| Route C | 313 |
| Route A | 86 |
| Route D | -40 |
| Route B | -134 |

*FIG. 7I*

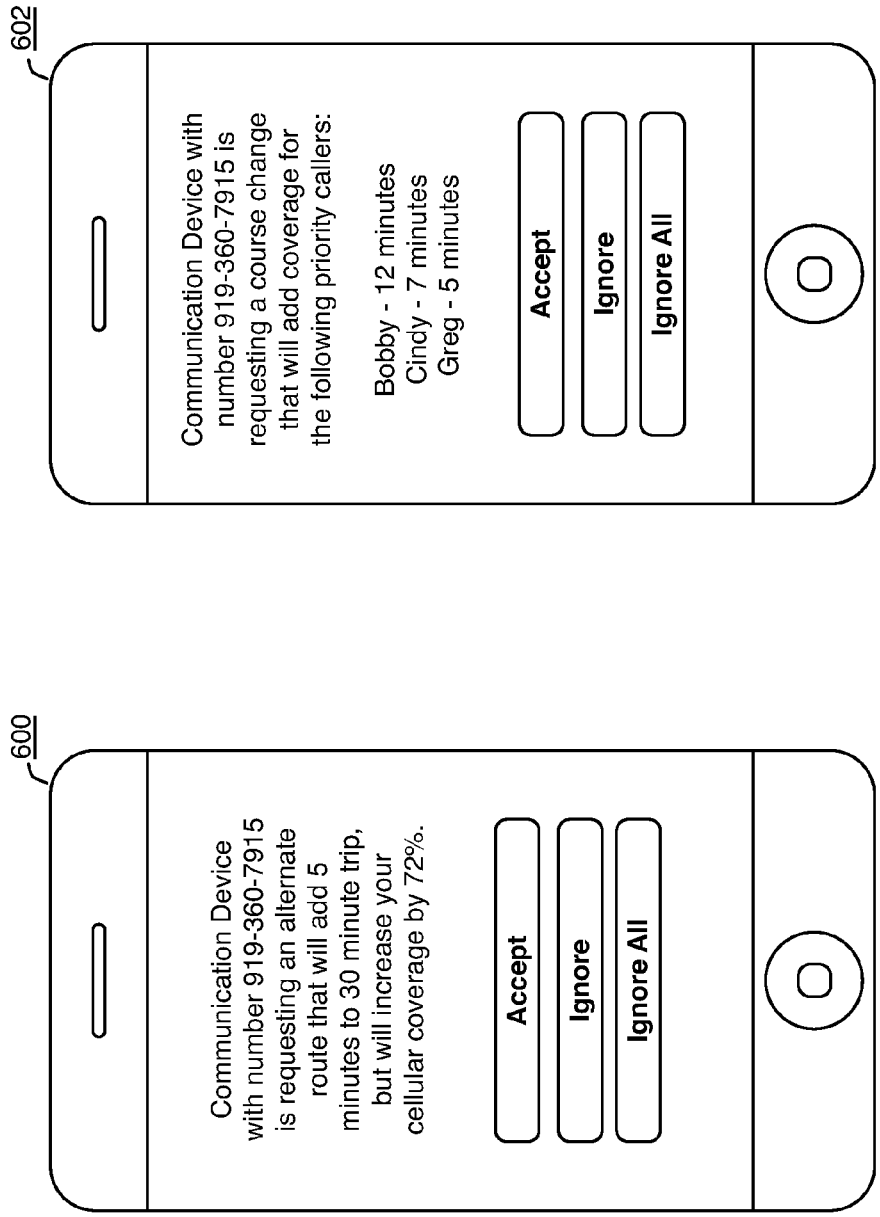

METHOD AND SYSTEM FOR USING CELLULAR COMMUNICATION DEVICE AVAILABILITY INFORMATION TO PREDICT COVERAGE OVERLAP BETWEEN CALLERS

CROSS REFERENCE TO RELATED APPLICATIONS

The present application claims priority from U.S. Provisional Application No. 61/236,305 filed on Aug. 24, 2009, the disclosure of which is incorporated herein by reference in its entirety.

FIELD OF THE DISCLOSURE

The present disclosure relates to a system and method for better predicting coverage overlap between cellular communication devices, thereby increasing the possibility of establishing a call.

BACKGROUND

Typical cell phone communication devices include address book applications that allow users to list and store their friends, family, and other acquaintances' contact information. The types of contact information stored include phone numbers, mailing addresses and email addresses. Some users are satisfied with the limited functionality of the address book as a helpful tool in today's communication devices because it allows callers to quickly view basic contact information of the person they wish to call.

While address books are common features in a cellular communication device, they provide only basic contact information. The information that is made available to the user does not inform the user if the callee is available or willing to accept a call. Users should be able to access the address book and view advanced contact information pertaining to the callee's status and availability within the address book to increase the caller's chances of reaching the callee when a call is placed to that particular callee. There are situations when a user may need to contact a callee immediately and simply having access to their name, telephone number and/or email address just would not be enough to guarantee that a call will be established between them.

Additionally, there are times when cell phone users enter dead zones or low coverage areas. In these cases, if a person is attempting to call them, the call is usually routed directly to the callee's answering service. It may be unreasonable for the caller to frequently call the callee back based on a series of random guesses of when the callee might be available to receive a call.

Thus, there is a need for a communication device to provide more advanced contact and availability information within the address book in order to better inform a caller of a callee's status. There is also a need for a communication device to automatically monitor and initiate a call to a previously unavailable callee when that person becomes available.

SUMMARY

Included are methods for determining the availability of a communication device. At least one embodiment of such a method includes receiving, via a network, first availability information from a first communication device and receiving second availability information from a second communication device. The method further includes determining an estimate of common coverage by comparing the first availability information with the second availability information and transmitting the estimate of common coverage to at least one of the first communication device and the second communication device.

Another embodiment of a method for determining the availability of a communication device includes receiving first availability information from a carrier server wherein the first availability information is associated with an updating communication device. The method further includes determining an estimate of common coverage by comparing the first availability information with second availability information where the second availability information is associated with a user communication device and establishing a communication link between the user communication device and the updating communication device contingent upon the estimate of common coverage.

Also included are systems for determining the availability of a communication device. At least one embodiment of such a system includes a control system that is adapted to receive, via a network, first availability information from a first communication device and second availability information from a second communication device. The control system is also adapted to determine an estimate of common coverage by comparing the first availability information with the second availability information and to transmit the estimate of common coverage to at least one of the first communication device and the second communication device.

Another embodiment of a system for determining the availability of a communication device includes a control system that is adapted to receive, via a network, first availability information from a carrier server, where the first availability information is associated with an updating communication device. The control system is also adapted to determine an estimate of common coverage by comparing the first availability information with the second availability information where the second availability information is associated with a user communication device. The control system is further adapted to establish a communication link, over the network, between the user communication device and the updating communication device contingent upon the estimate of common coverage.

Also included are embodiments of a computer-readable medium comprising instructions for determining the availability of a communication device. At least one embodiment of such a computer readable medium includes instructions for instructing a computer to receive, via a network, first availability information from a first communication device and second availability information from a second communication device. The computer readable medium also includes instructions for instructing a computer to determine an estimate of common coverage by comparing the first availability information with the second availability information and transmitting the estimate of common coverage to at least one of the first communication device and the second communication device.

Another embodiment of a computer readable medium comprising instructions for instructing a computer to determine the availability of a communication device includes a computer readable medium comprising instructions for instructing a computer to receive, via a network, first availability information from a carrier server, where the first availability information is associated with an updating communication device. The computer readable medium also comprises instructions for instructing a computer to determine an estimate of common coverage by comparing the first availability information with second availability information, where the second availability information is associated with a user communication device. The computer readable medium further comprises instructions for instructing a computer to establish a communication link, over the network, between the user communication device and the updating communication device contingent upon the estimate of common coverage.

Other systems, methods, features and advantages of this disclosure will be or become apparent to one with skill in the art upon examination of the following drawings and detailed description. It is intended that all such additional systems, methods, features and advantages be included within this description, and be within the scope of the present disclosure.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 illustrates a system diagram according to an exemplary embodiment of the present disclosure;

FIG. 2 gives an explanatory view showing periods of overlapping coverage between cellular communication devices;

FIGS. 4A and 4B illustrate an explanatory view showing a computation, a delivery of estimate of common coverage information, and a suggesting of alternate trip route information between communication devices;

FIGS. 7A through 7I show an exemplary determination of alternate route information according to FIGS. 6A and 6B;

FIG. 8A is an explanatory view showing a user interface of an enhanced communication device as it presents alternate trip route information;

FIG. 8B is an explanatory view showing a user interface of an enhanced communication device as it presents a route change;

DETAILED DESCRIPTION OF THE PREFERRED EMBODIMENTS

The embodiments set forth below represent the necessary information to enable those skilled in the art to practice the invention. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Note that at times the system of the present disclosure is described as performing a certain function. However, one of ordinary skill in the art would know that the program is what is performing the function rather than the entity of the system itself.

Although aspects of one implementation of the present disclosure are depicted as being stored in memory, one skilled in the art will appreciate that all or part of systems and methods consistent with the present disclosure may be stored on or read from other computer-readable media, such as secondary storage devices, like hard disks, floppy disks, and CD-ROM, or other forms of ROM or RAM either currently known or later developed. Further, although specific components of the system have been described, one skilled in the art will appreciate that a system suitable for use with the methods and systems consistent with the present disclosure may contain additional or different components.

Figure 1:
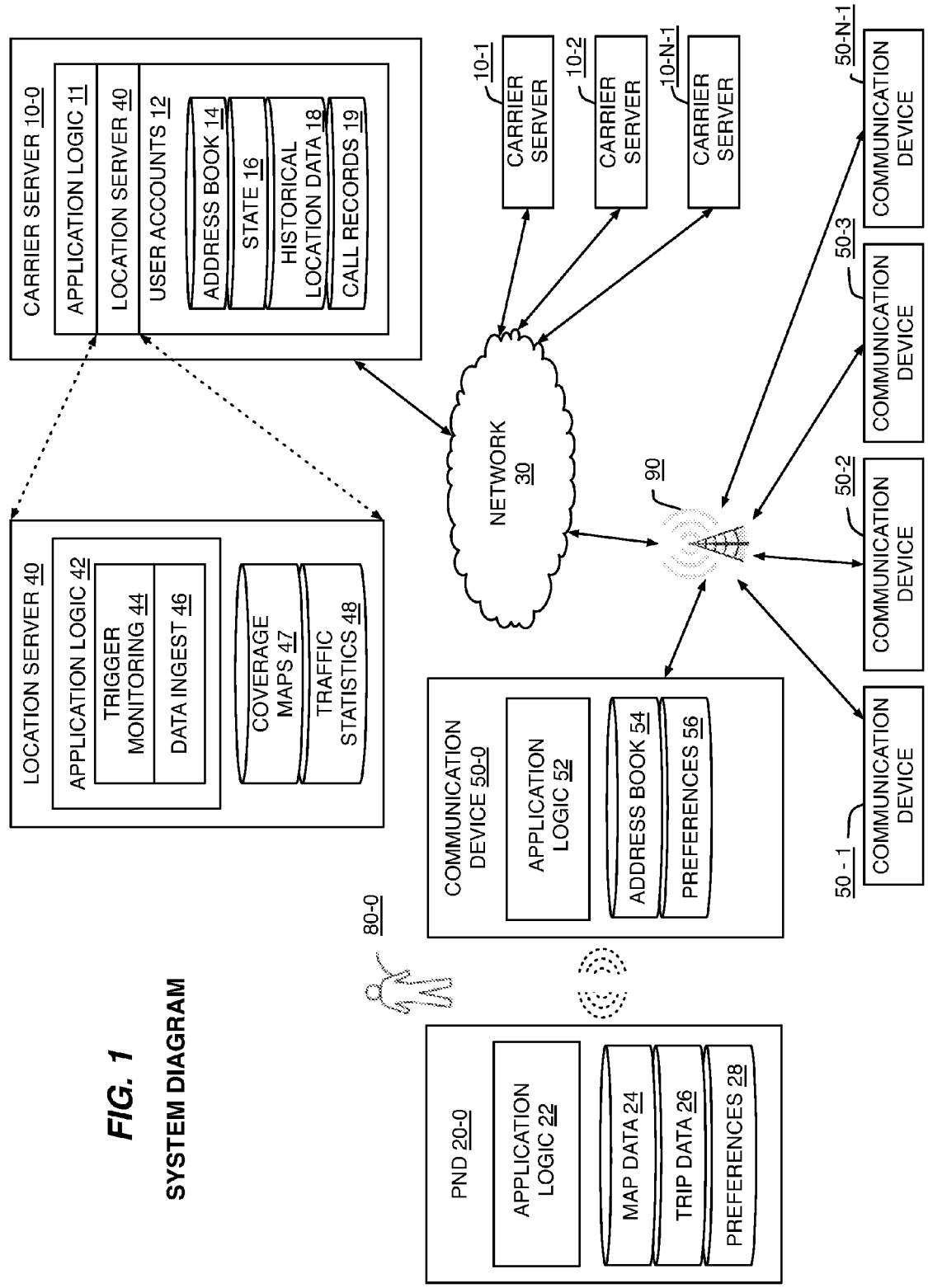

FIG. 1 illustrates a system diagram according to an exemplary embodiment. As illustrated, multiple communication devices 50-[0-(N−1)] may be connected via an external network, such as a communication network 30. Communication network 30 can include, for example, the Internet, a Wi-Fi® network (IEEE 802.11 compatible), a WiMax® network (IEEE 802.16 compatible), a Public Switched Telephone Network (PSTN) and/or other communication mediums. A user 80 may access the communication network 30 via one or more client devices 50-[0-(N−1)] and/or 20-[0-N] (via wireless tower or access point 90). The client devices may include, for example, portable communication devices 50-[0-(N−1)], personal navigation devices 20-[0-N], and/or other communication devices 50-[0-(N−1)]. It should be appreciated that while network 30, communication devices 50-[0-(N−1)], and connections illustrated in FIG. 1 are shown by way of example, this disclosure is not limited to these examples. The disclosure may be applicable to any communication device 50, client device, connection and network that support voice, data, and/or other types of communications.

Additionally, FIG. 1 includes one or more carrier servers 10 and a location server 40 that is coupled to at least one of the carrier servers 10. Carrier server 10 contains user accounts 12 for each communication device 50-[0-(N−1)]. User accounts 12 may be the personal accounts of each caller or callee within the network 30. User account 12 contains a copy of an address book 14 (e.g., names, phone numbers, email addresses, work numbers, etc.); user status 16 (e.g., signal strength, battery life, location information, trajectory, calendar information, etc.); historical, current, or future location information 18 (e.g., recently traveled waypoints, points of interest destinations, and/or the like); and call records 19 (e.g., previous incoming, outgoing, missed and dialed phone calls).

Each communication device 50 includes application logic 52 comprising software codes required to implement the functions of the communication device 50. Those functions include manipulation of the device's address book 54 and user preferences 56. User preferences 56 can include any setting specific to user(s) 80, such as, user availability, calendar information, user display characteristics, and/or the like.

Each PND 20 includes application logic 22 comprising software codes required to implement the functions of PND 20. Those functions may include manipulation of the device's map data 24, trip data 26 and user preferences 28. Map data 24 comprises the information necessary to render maps on a PND 20 display. Trip data 26 comprises information regarding the route that the PND 20 has traveled in the past, as well as routing data to future destinations. Preferences comprise any user 80 preferences controlling the operation of a respective PND 20.

Figure 11:
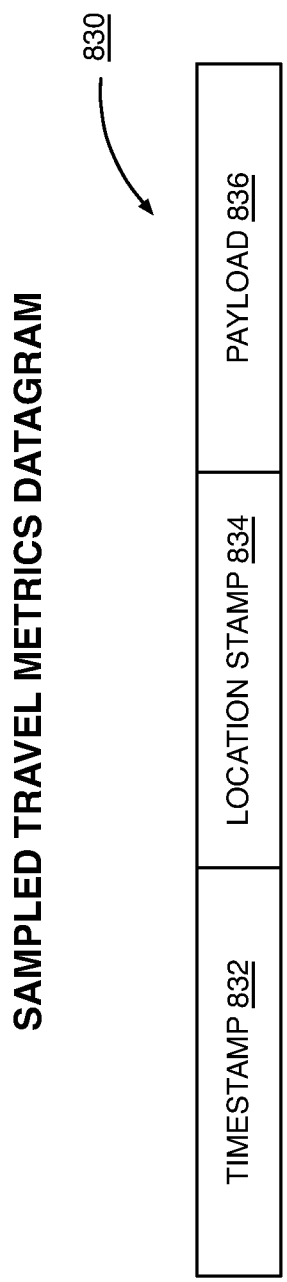
FIG. 11 is an exemplary data structure showing elements of a travel metric information datagram.

Location server 40 operates to monitor the locations of the users 80 and the coverage availability of each user 80 known to the system. Location server 40 comprises application logic 42 that includes software codes required to implement the functions of location server 40. The functions include a trigger monitoring function 44, which periodically examines the locations of devices 50 attempting to communicate, and initiates communications between those devices 50. A data ingest function 46 operates to receive travel metric data 830 (described below with reference to FIG. 11) from communication devices 50. Based on this travel metric data 830, location server 40 maintains coverage maps 47 indicating which carriers have coverage in which areas. Again based on the travel metric data 830, location server 40 also maintains traffic statistics 48 indicating traffic conditions based on location. Traffic conditions can include speed of travel, vehicle density, known vehicle accidents, and/or the like. In one embodiment, location server 40 is implemented as part of a carrier server 10. In another embodiment, location server 40 is implemented as a third party service, allowing multiple carriers to all contribute coverage information and traffic metric data 830. This embodiment has the advantage of allowing users 80 with different carriers 10 to benefit from the function of the location server 40 when communicating with out-of-network callees.

Figure 2:
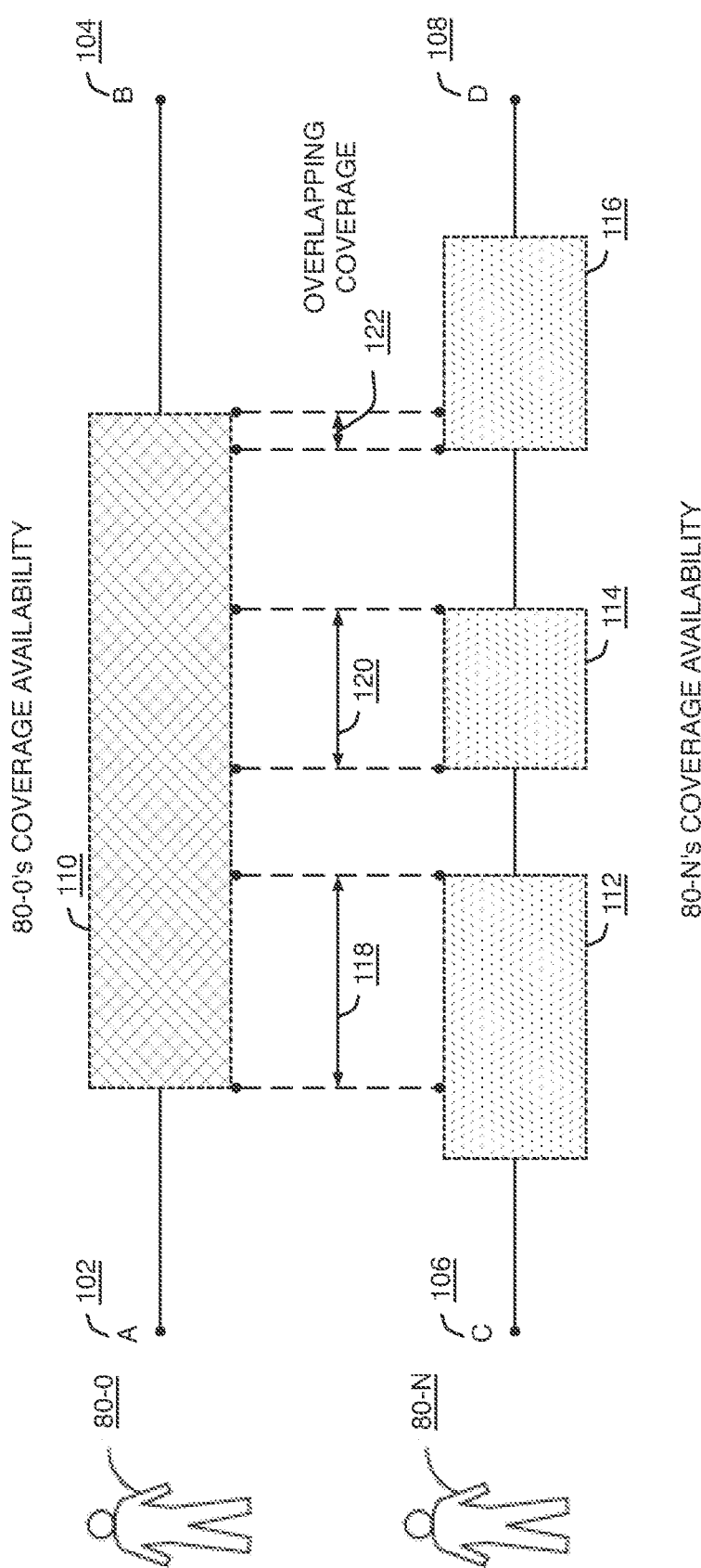

Shown in FIG. 2 is an example of periods of overlapping cellular coverage between communication devices 50-[0-(N−1)]. For example, a user 80 of a communication device 50 departs from point A 102 and arrives at point B 104. During the course of his trip, he has a stream of continuous cellular coverage 110 ranging from low to high, or any applicable level of coverage where the communication device 50 can receive or transmit a signal. During the same time, another user 80 of a communication device 50 departs from point C 106 and arrives at point D 108. His cellular coverage 112, 114, 116 is more staggered during the course of his trip.

As FIG. 2 illustrates, there are periods 118, 120, 122 where the users have overlapping coverage between them. As a non-limiting example, two traveling salesmen leave for a convention located one hour from their starting point. The first salesman does not have cellular coverage for the first 15 minutes of his trip, but experiences suitable coverage for a continuous period of 45 minutes during his trip. As the second salesman begins his trip on the other side of the country, his cellular coverage is limited to various time frames during his trip. The first salesman needs to call the second salesman to convey some important information regarding the convention, but there are only three distinct periods in which each salesman will have suitable coverage for either of them to receive or transmit a signal. These periods are known as overlapping coverage.

Figure 3:
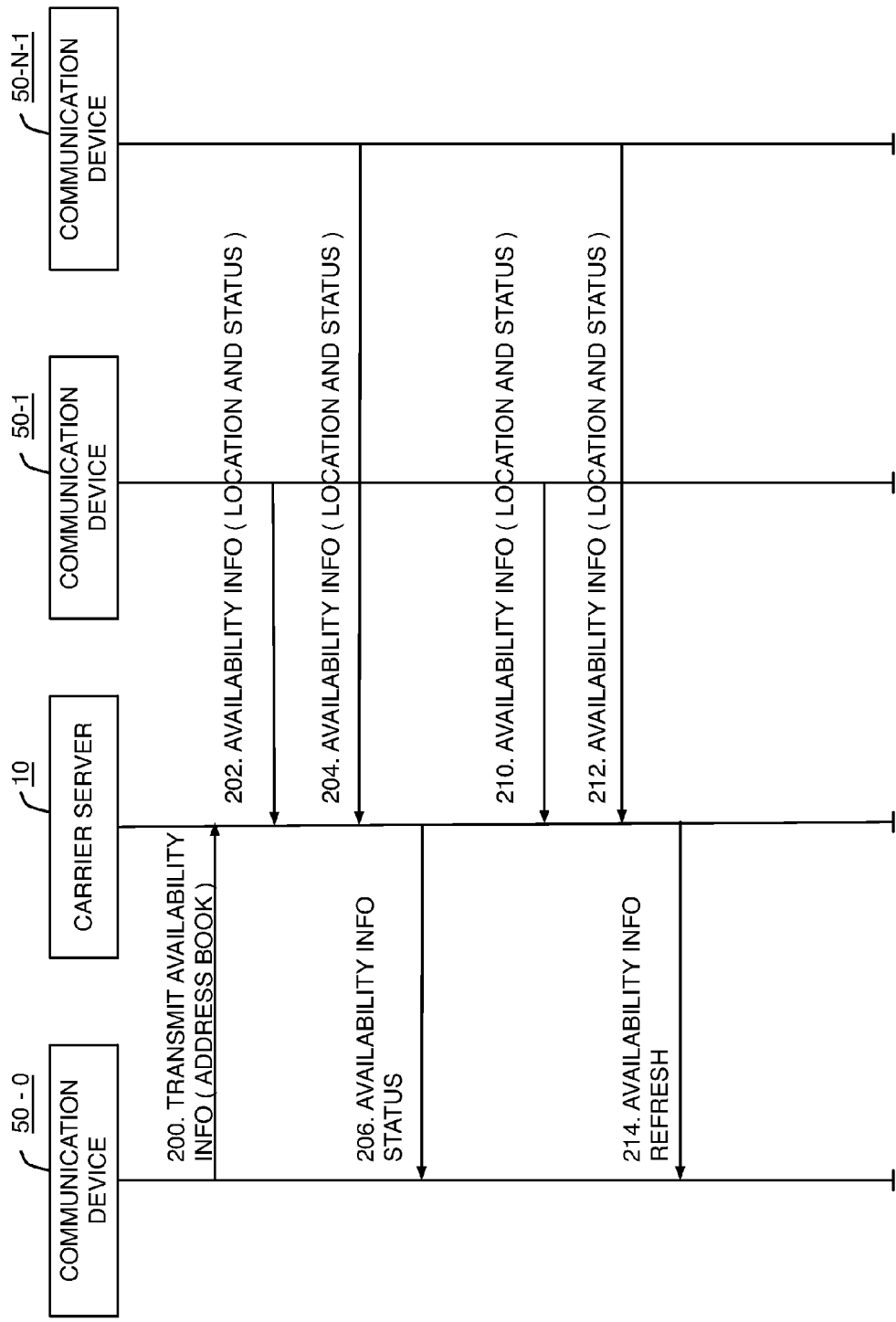
FIG. 3 is an explanatory view showing an exemplary flow of multiple cellular communication devices as they connect and exchange availability information through a network.

FIG. 3 is a functional diagram of an exemplary local communication environment illustrating exchanging availability information between communication devices 50-[0-(N−1)]. The embodiment emphasizes how the communication devices 50-[0-(N−1)] receives and transmits availability information between each other. According to FIG. 3, a first communication device 50-0 transmits address book availability information 200 to the carrier server 10. The availability information may include, but is not limited to, signal strength, battery life, location information, cellular communication device trajectory, calendar information, and/or biometrics.

In another embodiment, the transmission signal may be implemented via SMS text messaging, or any other standard communication protocol such as, the Internet, a Wi-Fi® network (IEEE 802.11 compatible), a WiMax® network (IEEE 802.16 compatible), a Public Switched Telephone Network (PSTN), AppleTalk, DECnet, IPX/SPX, Server Message Block (SMB), Systems Network Architecture (SNA), or Distributed System Security Architecture (DSSA).

In an embodiment, one or more additional communication devices 50-[0-(N−1)] periodically connect and transmit their then current availability information including location and status information (202, 204, 210, 212) to the carrier server 10. Once the carrier server 10 receives and compiles the availability information (202, 204) from the other communication devices 50-[0-(N−1)], it transmits the availability information (206) to the first communication device 50-0 for a status update of its address book. In a further embodiment, the carrier server 10 executes a periodic refresh cycle, and the availability information (e.g., location and status information updates transmitted to the carrier server 10 from communication devices 50-[0-(N−1)] (210, 212)) is re-transmitted (214) to the first communication device 50-0.

FIG. 4A is a functional diagram illustrating an exemplary embodiment of a local communication environment by which the estimate of common coverage is determined and delivered between communication devices 50. Prior to communication devices 50-0, 50-1 initiating a call, each communication device 50-0, 50-1 determines its location information 300, and transmits its location information and signal strength 302 to the carrier server 10 based on various refresh intervals of the carrier server 10. Once a callee (e.g., user of communication device 50-1) has been selected 304 by the user of communication device 50-0, for example, communication device 50-0 transmits, either wirelessly or wired, its location information and availability information to the carrier server 10 as a pre-qualification of the call 306 to the selected callee. The system executes a similar process on the callee's communication device 50-1. Once the carrier server 10 has accessed the location information and signal strength of the callee communication device 50-1, the carrier server 10 determines 308 an estimate of common coverage, as for example predicted talk time for the caller and callee pair.

An estimate of common coverage can be a determined duration of time where an acceptable level of cellular coverage exists between both the caller device 50-0 and the callee device 50-1 to receive and/or transmit call(s). As such, it could be based on the caller device's 50-0 and callee device's 50-1 location information, signal strength, or other availability information. In an alternate embodiment, it could be based on predicted locations of the caller device 50-0 and callee device 50-1 in the event an overlap in coverage does not exist when the call is first placed. In this example, the caller's communication device 50-0 is also referred to as the user communication device 50-0 and the callee's communication device 50-1 is also referred to as the updating communication device 50-1. In another embodiment, the estimate of common coverage between the caller device 50-0 and callee device 50-1 is returned to the caller device 50-0 while all other availability information, such as signal strength, location information or calendar information is kept private. The estimate of common coverage of both the caller device 50-0 and the callee device 50-1 is transmitted to the user communication device 50-0 as callee status 310. The caller 80-0 is presented on caller device 50-0 with the estimate of common coverage 312 (e.g., estimated talk time) and opts to place the call to the callee 314. The callee 80-1 at callee device 50-1 accepts the call 316 and the sequence is complete. In an embodiment, callee 80-1 may be presented the estimated talk time on callee device 50-1 prior to answering, or upon answering, the call.

In an embodiment, the updating communication device 50-1 and the user communication device 50-0 transmit availability information updates to the carrier server 10 periodically. The updates reflect each device's changing availability information (e.g., location information, status information, alternate trip route, a route change, availability information, battery life, calendar information, etc.). Alternate trip route information may include, but is not limited to, historical, current, or future location information, such as, current and/or ending location waypoints, and current, present, or future routes, street addresses, highways, roadways, or points of interest that are compiled and designated as alternate routes for a communication device. Alternate routes can be determined by, for example, a PND 20 and that determination may use a communication device's 50 estimate of common coverage and location information (e.g., current/ending location waypoints, current/present/future routes, addresses or points of interest etc.). In an embodiment, a route change may be a suggested route the caller or callee may take that will provide the best possible cellular coverage between the parties as they travel to their destination. The route change may consist of current/ending location waypoints, current/present/future routes, addresses or points of interest that will guide the caller or callee to their point of destination.

Figure 4B:
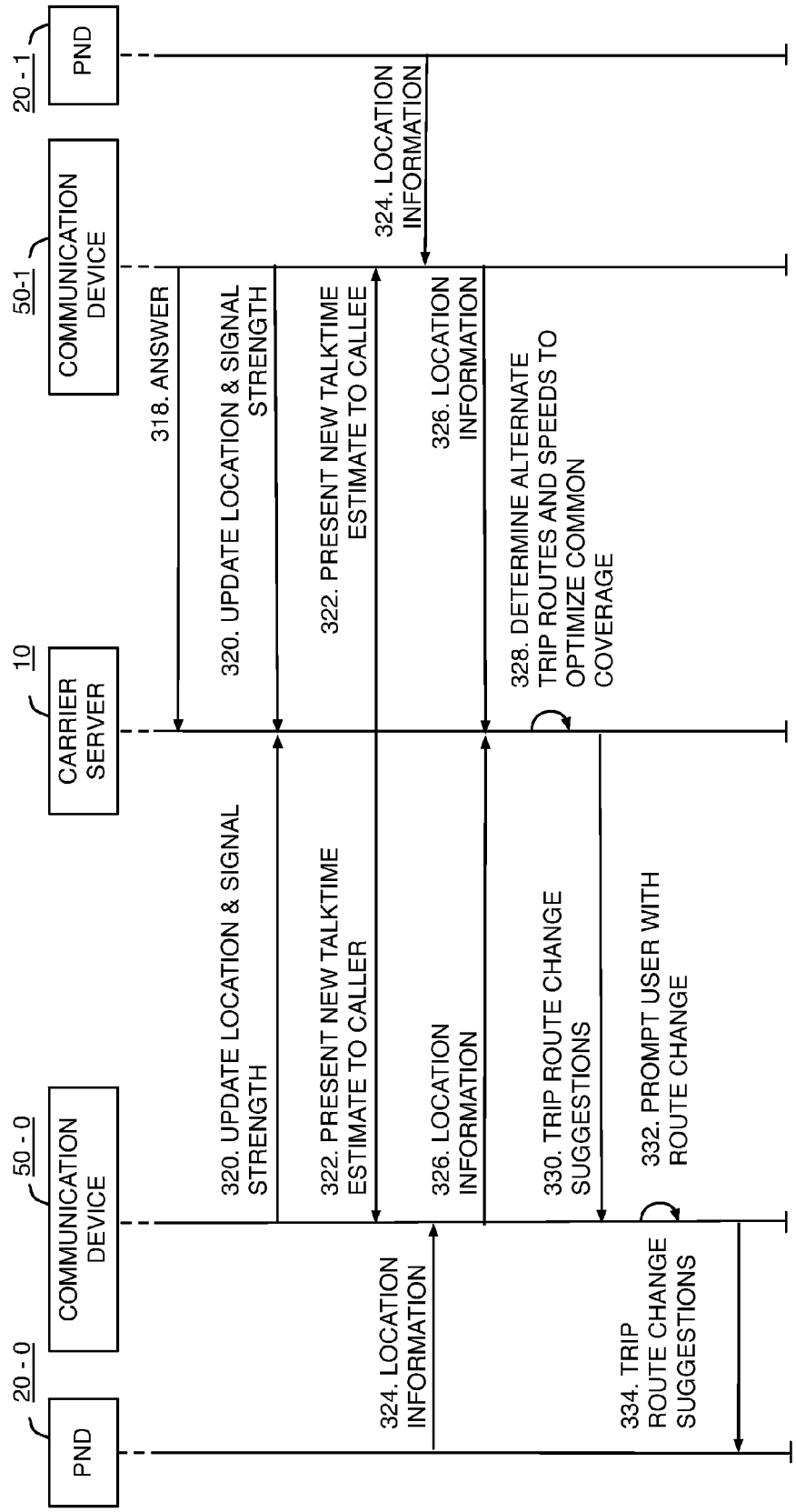

FIG. 4B is a functional diagram illustrating an exemplary embodiment of a local communication environment by which the estimate of common coverage is determined and delivered between communications, a continuation to the diagram in FIG. 4A. According to FIG. 4B, a user communication device 50-0 and an updating communication device 50-1 transmit their availability information, such as location and signal strength 320, to the carrier server 10. Both the updating communication device 50-1 and the user communication device 50-0 receive a transmission 322 from the carrier server 10, which includes the estimate of common coverage (e.g., new talk time estimate). In an alternate embodiment, the estimate of common coverage may be computed according to the updating communication device and the user communication device location information and signal strength. Each PND 20-0, 20-1 transmits location information to the updating communication device 50-1 and user communication device 50-0 respectively 324. Location information includes, but is not limited to, historical, current, or future departure and/or destination waypoints, current and/or ending location waypoints, current, present, or future routes, addresses, points of interest or any other location information pertaining to global positioning satellite formalities. The updating communication device 50-1 and user communication device 50-0 each transfer location information 326 to the carrier server 10. Upon receiving the location information from each communication device, the carrier server 10 determines 328 an alternate trip route that reflects the best route based on the caller's and callee's destination relative to their estimate of common coverage. An alternate trip route could provide a route that will maximize talk time between the caller and the callee. The carrier server compiles a route change suggestion file and transmits one or more route change suggestions 330 to one or both of communication devices 50-0, 50-1. The route change suggestions can be a set of alternate waypoints, current/present/future routes, addresses, points of interest or any other location information pertaining to global positioning satellite formalities that correspond to the caller's or callee's arrival or destination. Once the communication devices 50-0 and/or 50-1 receive the route change suggestions, they are presented 332 to the caller and/or the callee on their respective communication devices 50-0 and 50-1. The updating communication device 50-1 and/or the user communication device 50-0 receive the route change suggestions and transmit 334 them to the respective PNDs 20-0, 20-1.

Figure 5:
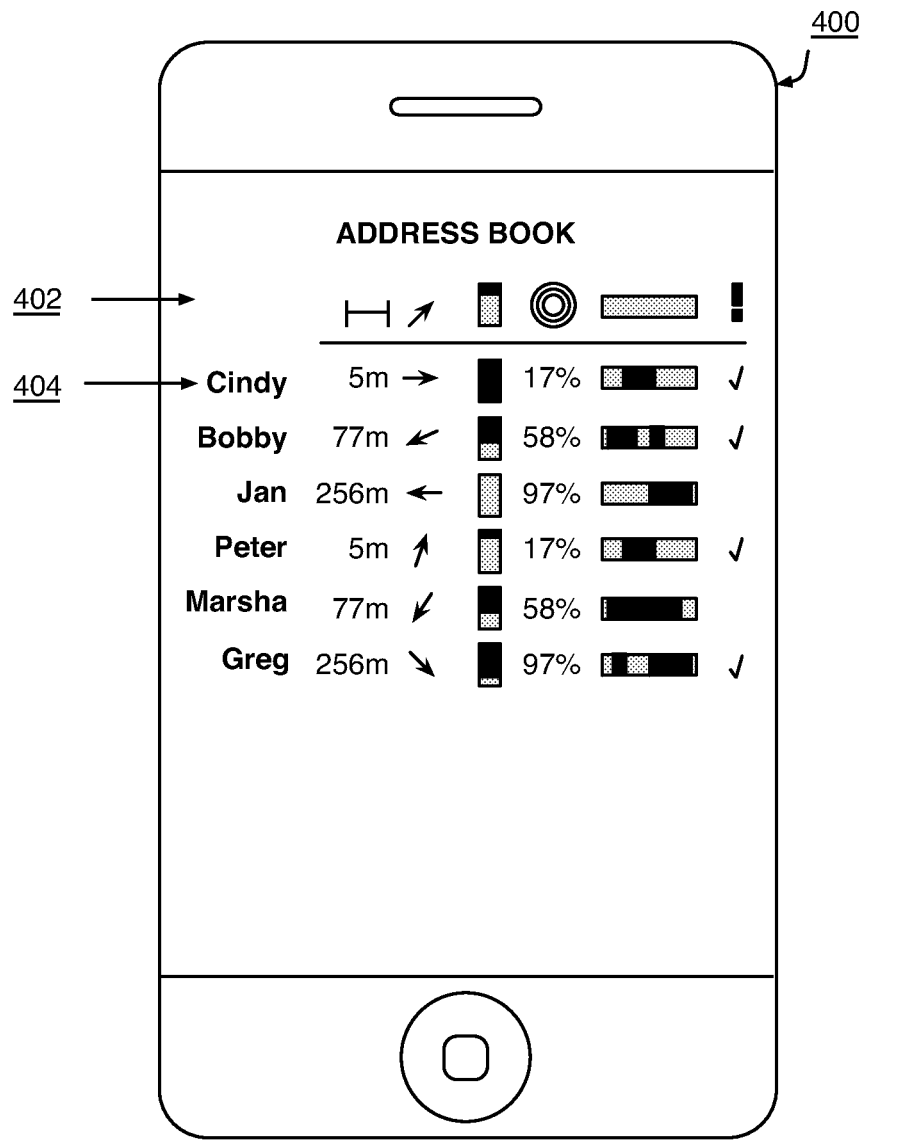
FIG. 5 is an explanatory view showing a user interface of an enhanced cellular communication device address book dialog as it presents availability information.

FIG. 5 is an exemplary user interface illustrating the display of a communication device as it presents availability information in an address book. The address book dialog 400 can display callee entries 404 and/or various forms of indicators 402 vertically or horizontally. Indicators include, but are not limited to, distance indicators 420, directional indicators 422, battery strength indicators 424, signal strength indicators 426, estimate of common coverage indicators 428, and/or notification indicators 430.

The distance indicator 420 can display the distance between the user communication device and the updating communication device. Distance includes, but is not limited to, distance in miles, kilometers, meters, feet, square footage, inches, or the like. In an alternate embodiment, the distance indicator can display the distance between the user communication device and any other type of structure, building, point of interest, destination, business, restaurant, store, another communication device not affiliated with the user communication device or the updating communication device, such as a friend or a friend's communication device, or any other similar venue specified by the caller or callee.

The direction indicator 422 can display the geographic orientation of the user communication device or the updating communication device. The geographic orientations include, but are not limited to, north (N), south (S), east (E), west (W), northeast (NE), northwest (NW), southeast (SE), southwest (SW), or the like. In an alternate embodiment, the distance indicator can display the distance between the user communication device and any other type of structure, building, point of interest, destination, business, restaurant, store, another communication device not affiliated with the user communication device or the updating communication device, such as a friend or a friend's communication device, or any other similar venue specified by the caller or callee.

The battery indicator 424 can display battery life of a communication device in the form of a percentage, a graphical indicator, or the like. In embodiments, the battery life may be presented in the form of a color interface, a shape interface, an icon interface, or the like. The battery indicator may also present battery life of a PND or the like.

The signal strength indicator 426 can display the signal strength in the form of a percentage, a graphical indicator, or the like. In embodiments, the signal strength may be presented in the form of a color interface, a shape interface, an icon interface, or the like.

The estimate of common coverage indicator 428 displays the estimate of common coverage between the updating communication device 50 and the user communication device 50.

The estimate of common coverage indicator 428 could be presented in the form of a percentage or a graphical indicator, such as a color interface, a shape interface, an icon interface, or the like. In an alternate embodiment, the estimate of common coverage indicator 428 may also present a timeline of when the device will have suitable cellular coverage according to the user communication device 50 and updating communication device 50 availability information.

The notification indicator 430 displays whether a notification request has been set that will trigger the system to initiate a call to the updating communication device 50 or prompt the user communication device 50 that the updating communication device 50 is capable of receiving a call. The request may be an audible alert, visual alert, text message, icon, shape, or the like. The following are examples of preference profile weighting coefficients that are used to rank callee and/or caller availability information, which can be used to determine alternate trip routes to transmit to the updating communication devices 50 and/or the user communication devices 50. The preference profile weighting coefficients are also known as factors. The factor "Call Frequency" may be described as the number of calls received from a particular caller's phone number over a specified time interval. The factor "Length of Calls," may be described as the average length of calls received from a particular caller's phone number over a specified time interval. The factor "Time of Day of Calls" may be described as the average time of day calls are received from a particular caller's phone number. "Proximity to Caller" may be described as the current, present, or future distance to the communication device 50 represented by any given number of a caller's communication device 50. "Ignored Calls" may be described as the number of ignored calls corresponding to a caller's phone number over a specified time interval. "Caller Location" may be described as the current, future, or present location of a caller's communication device 50. "Caller Speed" may be described as the current travel speed of a caller's communication device 50. "Social Distance to Caller" may be described as the social distance between the user of a user communication device 50 and the user of an updating communication device 50. The "social distance" can be the degree of separation between a caller and a callee in, for example, an online social network. "Profile Proximity to the Caller" may be described as a measure of similarity between the caller and callee, for example, based on user profiles of the caller and callee. "Calendar Entries" may be described as meetings or events scheduled between the caller and callee that may be used to influence alternate route selection. "Favorites" may be described as caller- and/or callee-specified favorites to influence alternate route selection.

FIGS. 6A, 6B, and 7A-7I together illustrate the steps involved in determining alternate route information for a user communication device 50 and/or updating communication device 50 wherein the proposed routes are assigned scores that are determined based on maximizing communication capabilities between callers and callees represented in a user communication device's 50 and/or updating communication device's 50 address book 54.

Figure 6A:
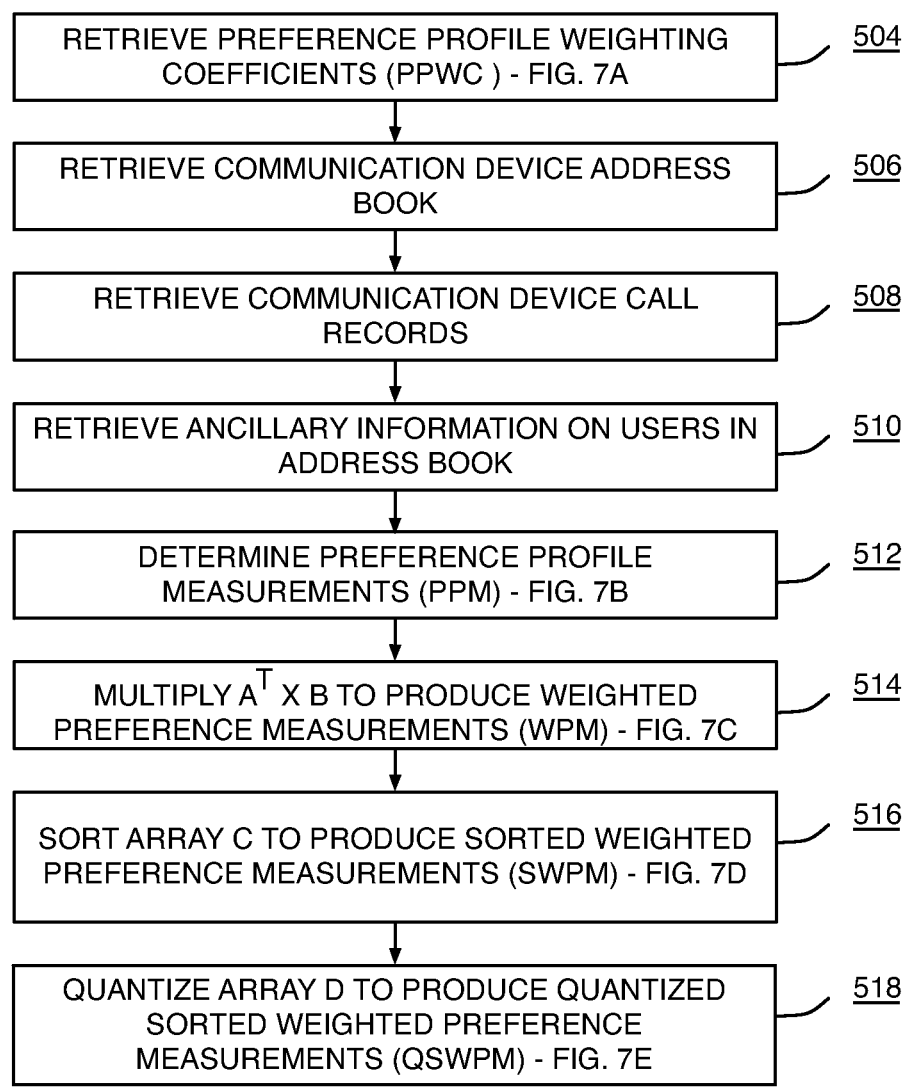
FIG. 6A is a flow chart depicting logic used to create access groups on the carrier server.

FIG. 6A is a flowchart illustrating exemplary steps that may be performed to determine quantized sorted weighted preference measurements. Preference profile weighting coefficients (PPWC) are retrieved 504, for example by carrier server 10 (see FIG. 7A). The PPWC can be user-settable preferences. Address book availability information is retrieved 506 from updating communication device 50 and/or the user communication device 50. In an alternate embodiment, an address book 14 may be mirrored on the carrier server 10. Call records are retrieved 508 that are associated with the user account 12 of the user communication device 50 and/or the updating communication device 50. Ancillary information from the user communication device 50 and/or the updating communication device 50 is retrieved 510 from the respective user account. Ancillary information includes, but is not limited to, information indicative of the relationship between the user communication device 50 and the updating communication device 50 that falls outside information captured directly by the carrier servers 10. Non-limiting examples of ancillary information include but are not limited to social distance, profile proximity, calendar entries, physical proximity, and the like.

Based on the information retrieved in steps 504-510, preference profile measurements (PPM) (shown in FIG. 7B) are determined 512. The PPWC is multiplied 514 by the PPN according to equation (1) below to produce the weighted preference measurements (WPM) (shown in FIG. 7C). The WPM is sorted 516 in a descending manner according to equation (2) below to produce the sorted weighted preference measurement (SWPM) (shown in FIG. 7D). The SWPM is quantized 518 according to equation (3) to produce the quantized sorted weighted preference measurement (QSWPM) (shown in FIG. 7E). In this example, address book entries are quantized using a three-step quantizer, the groups being assigned the values 2, 1 and 0 respectively. Accordingly, the QSWPM represents the preferences of the user of a user communication device 50 and/or the user of an updating communication device 50, and will be used to weight the proposed routes in FIG. 6B.

Figure 6B:
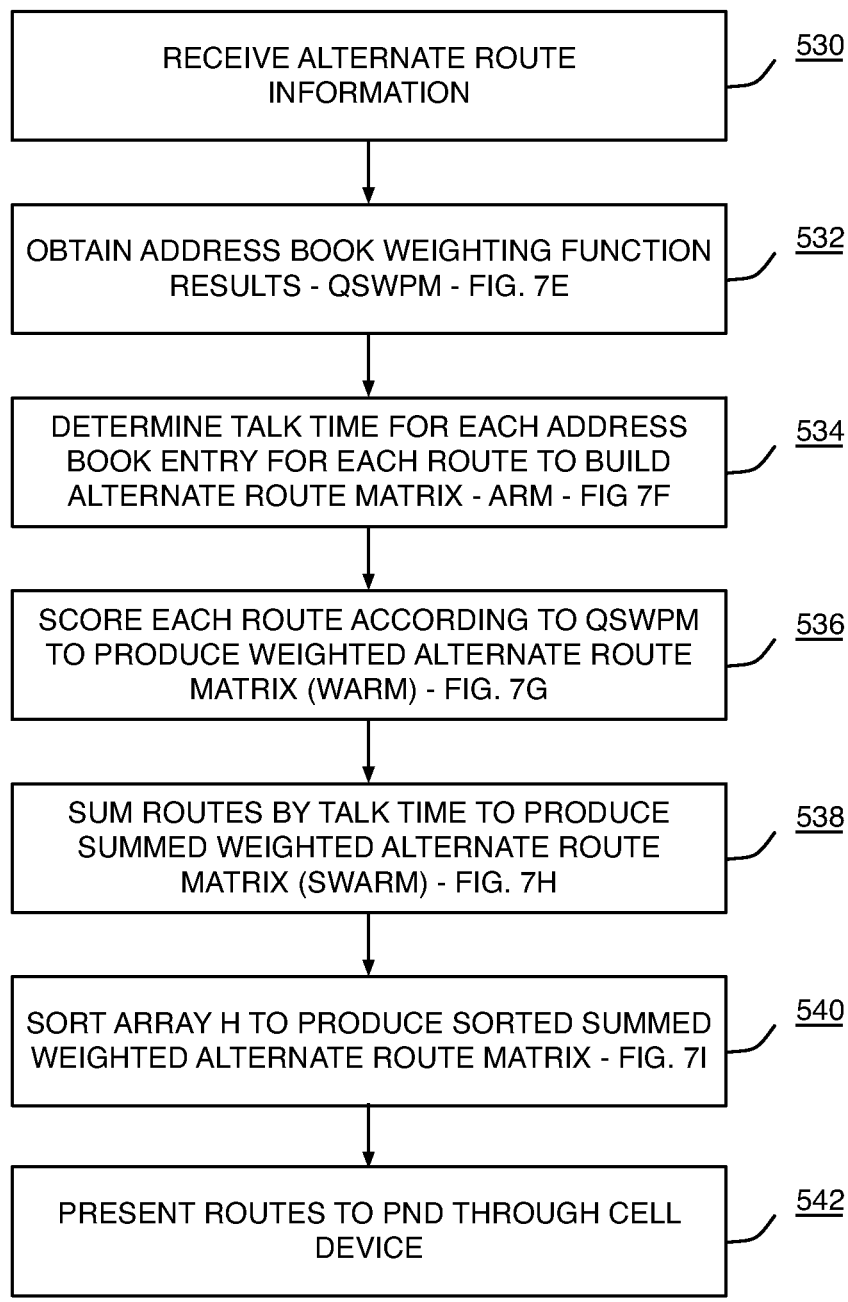
FIG. 6B is also a flow chart depicting logic in determining alternate trip routes based on the estimate of common coverage and various other predetermined values.

FIG. 6B is a flowchart illustrating exemplary steps that may be performed for computing alternate trip routes based on maximizing coverage or talk time as weighted by communication device 50 users 80. Referring to FIG. 6B, alternate route information is received 530, for example by carrier server 10, from the user communication device 50 and/or the updating communication device 50. In an alternate embodiment, the carrier server 10 may also obtain the alternate route matrix from the PND 20 through the user communication device 50 or the updating communication device 50. ARM cells are populated with the change in cellular coverage for the user communication device 50 and/or the updating communication device 50 and route The address book weighting function results 7E are obtained 530 and the talk time for each address book entry for each route 550 is determined 534. The weighted alternate route matrix (WARM) (shown in FIG. 7G) is determined 536 according to equation (4) below. Again, each matrix cell of the WARM contains a weighted availability time change. The summed weighted alternate route matrix (SWARM) (shown in FIG. 7H) is determined 538 by summing for each route the weighted availability time changes according to equation (5) below. Finally, the sorted summed weighted alternate route matrix (SSWARM) (shown in FIG. 7I) is determined 540 according to equation (6) below by sorting the SWARM. Accordingly, the routes are now sorted in a descending manner, the top route indicating the route that will result in the greatest positive change in availability for the weighted user communication device's 50 and/or updating communication device's 50 weighted address book 54. In an embodiment, the alternate routes can be presented 542 to a PND through a corresponding communication device 50.

$$[WPM]_{1*users} = [PPM^T]_{coefs*1} [PPWC]_{coefs*users} \quad \text{Equation (1)}$$

$$[SWPM]_{1*users} = \text{sorted}[WPM]_{1*users} \quad \text{Equation (2)}$$

$$[QSWPM]_{1*users} = \text{quantized}[SWPM]_{1*users} \quad \text{Equation (3)}$$

$$[WARM]_{routes*users} = [ARM]_{routes*users} * [QSWPM^T]_{1*users} \quad \text{Equation (4)}$$

-continued $$[SWARM]_{route*1} = \sum_{k=1}^{users} WARM_{route*k} \quad \text{Equation (5)}$$

$$[SSWARM]_{route*1} = \text{sorted}[SWARM]_{route*1} \quad \text{Equation (6)}$$

Now turning to FIGS. 8A 600 and 8B 602 which are explanatory views depicting the user interface of a cellular communication device 50 configured to present alternate trip route information and route change information. The dialogs are used to prompt the user 80 of the cellular communication device 50 when alternate trip route information has been detected. FIG. 8A suggests an alternate trip route based on the updating user's estimate of common coverage 600. FIG. 8B is suggesting a route change in order to maximize coverage 602.

Figure 9:
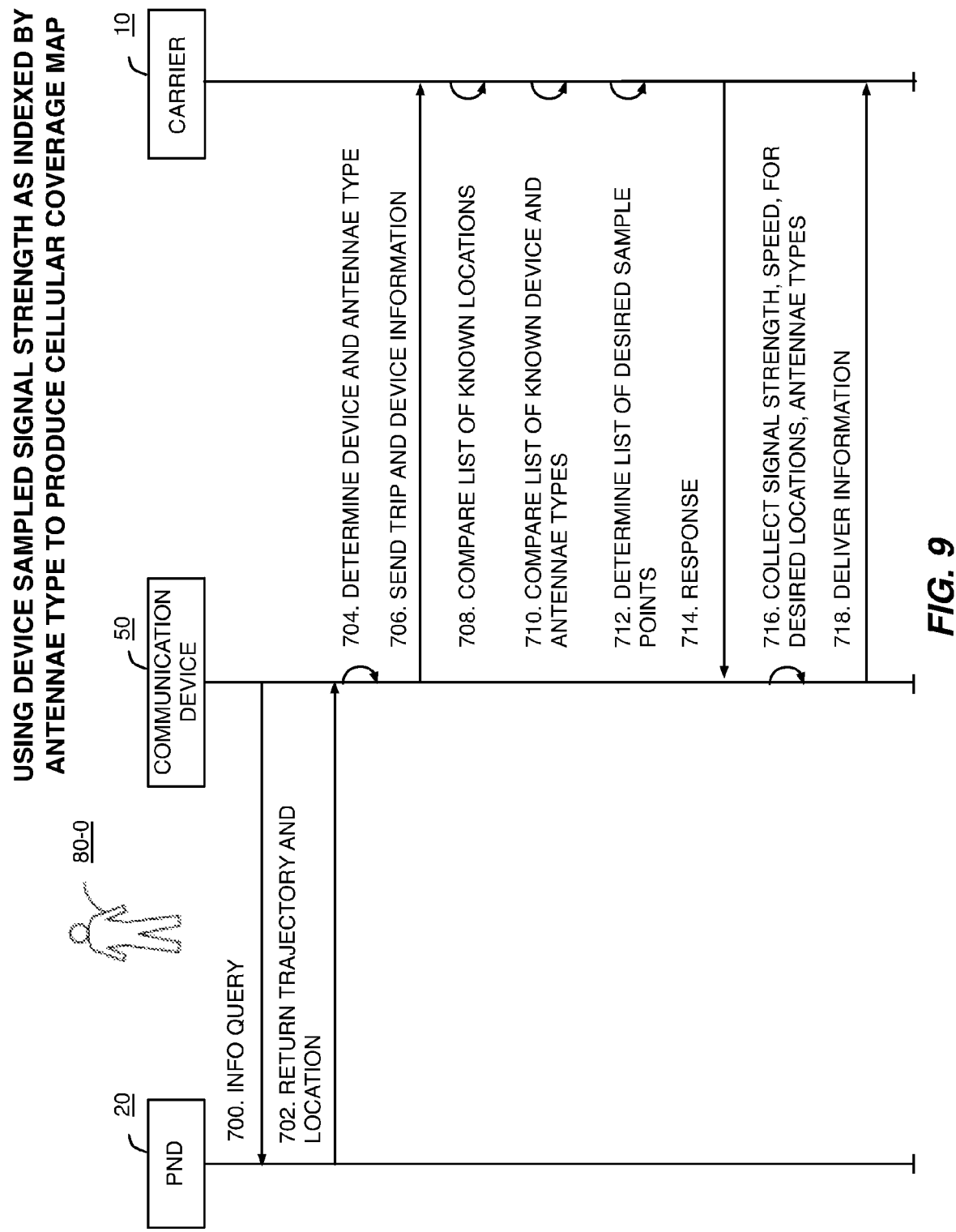
FIG. 9 is an explanatory view showing a method for producing the cellular coverage map.

FIG. 9 is a flowchart illustrating steps that can be performed to produce a cellular coverage map in accordance with an embodiment of the disclosure. A cellular coverage map is a data structure that stores cellular coverage availability information by geographic location. A communication device 50 queries 700 a PND 20 for trip route information, and the communication device 50 returns 702 the trip route information (e.g., trajectory and location) to communication device 50. Once the information has been received, the antennae and device type for the corresponding communications device are determined 704, and the trip route information and device/antennae information is provided 706 to carrier server 10. Antennae information is stored because cellular coverage availability may vary depending on the type of antennae employed on the corresponding communication device 50. Carrier server 10 compiles and compares 708 a list of possible sample points (e.g., known locations) obtainable from the communication device's 50 trip route to a list of known sample points in the carrier server's database and also compares 710 a list of known device and antennae types. Carrier server 10 determines 712 a list of sample points and device information the carrier server 10 recommends for the communication device 50 to provide. This information is returned 714 to the communication device 50. Once communication device 50 receives the list, it will collect 716 some or all of the sample points and device information (e.g., signal strength and speed for desired locations, antennae types, etc.) and deliver 718 this data to carrier server 10.

In an alternate embodiment, a communication device 50 collects trip route information from PND 20 and submits it to carrier server 10, which constructs a database of continual travel speeds to provide to the PND 20. To mitigate the privacy concern, the travel speed of the PND 20 can be anonymized before being submitted to the carrier server 10. The travel speed information is transferred to a user communication device 50 and/or an updating communication device 50 running the appropriate ad hoc protocol before submission. This embodiment allows carrier server 10 to accumulate the desired data while maintaining privacy.

In an alternate embodiment, in an architecture where a communication device 50 gathers information from a PND or the like, that information can also be submitted to the location server 40 (of FIG. 1) to build a traffic statistics database 48 of traffic patterns, which can in turn be used to better predict route times, alternate routes, and the like. Naturally this causes privacy concerns in that location server 40 could be compelled to turn traffic statistics data over to law enforcement in certain circumstances. To mitigate this problem, we introduce the scheme presented in FIG. 10.

Figure 10:
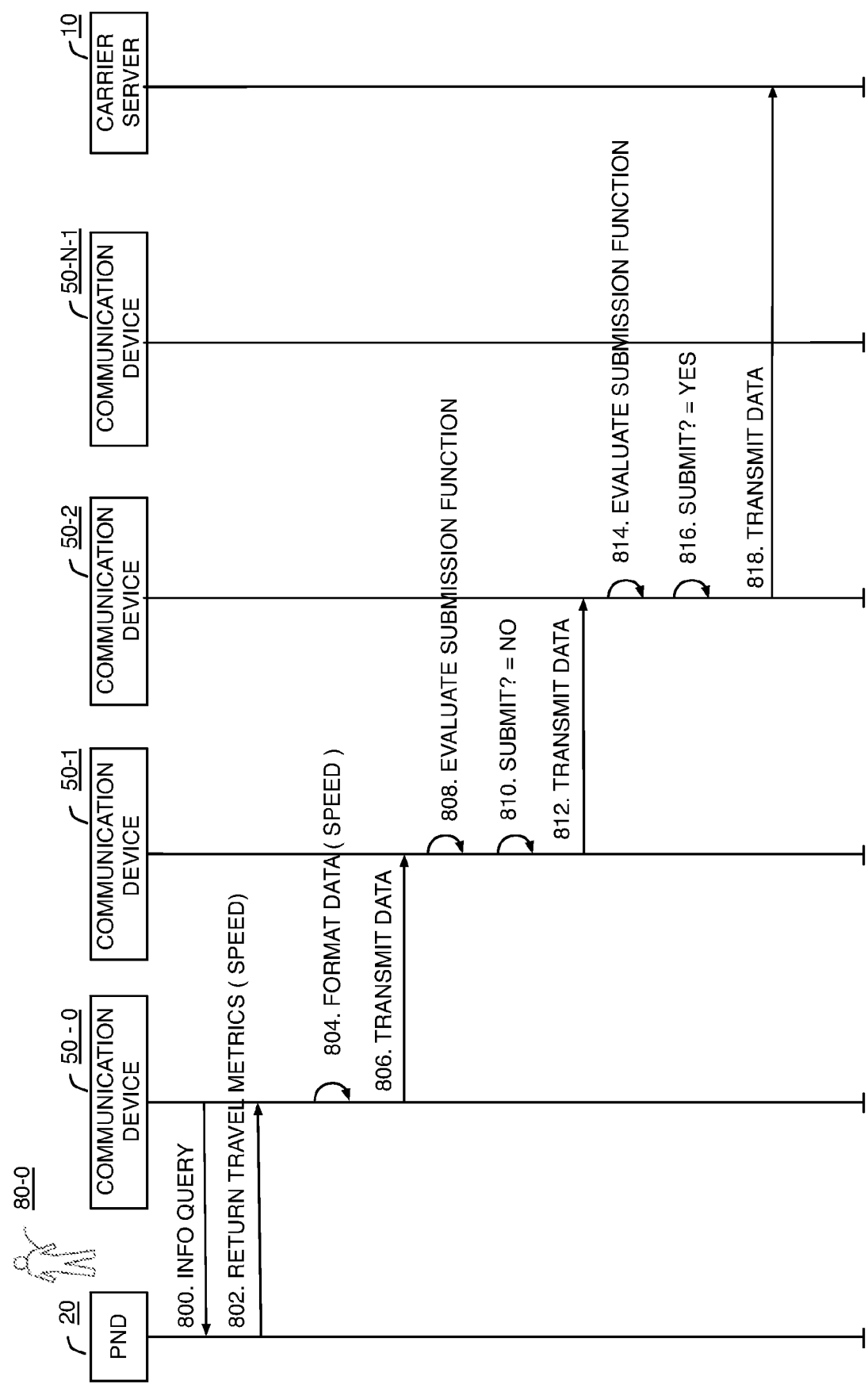
FIG. 10 is an exemplary flow chart showing a process by which travel metric information is transferred from one communication device to another until a terminal condition is met, at which time travel metric information is transmitted to a carrier server.

FIG. 10 is an exemplary flow chart showing the process by which travel metric information is transferred from one communication device 50 to another until a terminal conditional is met, at which time the travel metric information is transmitted to carrier server 10. Referring to FIG. 10, the first communication device 50-0 queries 800 a PND 20, which returns travel metrics 802 (e.g., speed). The data is formatted 804 at communication device 50-0, according to the structure 830 shown in FIG. 11, which includes a timestamp 832, location stamp 834, and payload 836. The sampled travel metrics datagram 830 contains fields for the timestamp 832 indicating when the payload 836 was captured and the location (location stamp 834) at which the payload 836 was captured. The structure 830 does not contain information indicating the identity of the user communication device 50 or the updating communication device 50 that captured the payload. The communication device 50-0 attempts to locate another communication device (e.g., 50-1) running the appropriate software for the purpose of transferring 806 the sampled travel metrics datagram 830. The receiving communication (or PND) device receives the sampled travel metrics datagram 830 and evaluates 808 the submission function represented by FIG. 12. If the result of the submission algorithm is negative 810, the sampled travel metrics datagram 830 is transmitted 812 to the next communication device 50-3. The submission function is then evaluated again 814, and if the result is positive 816, then the sample metrics datagram 830 is transmitted to the carrier server 10. By using the process shown in FIG. 12, the source of the sampled travel metrics datagram 830 is anonymized and the location server 40 is not able to determine the identity of the updating, user, and/or capturing communication device 50.

Figure 12:
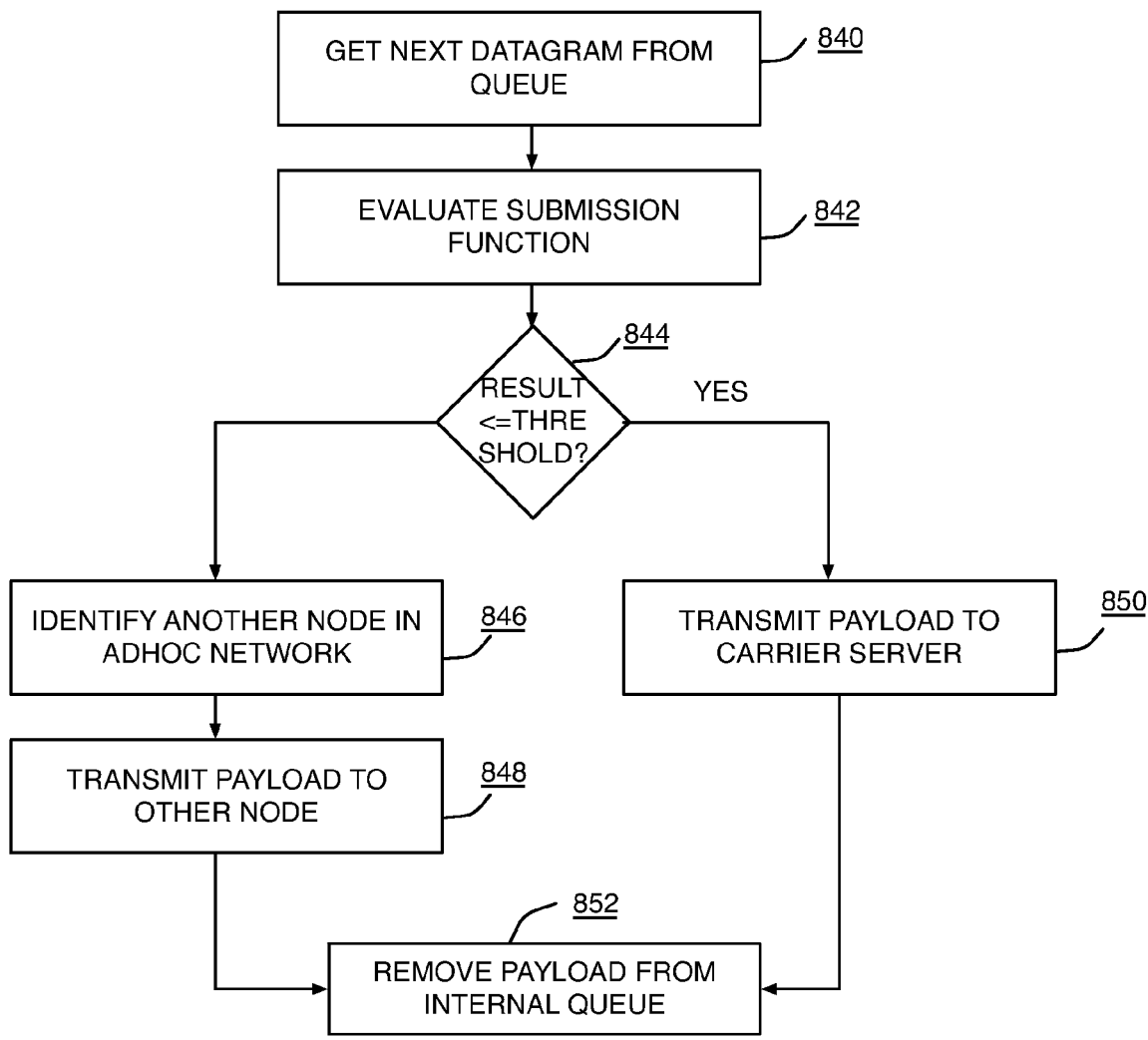
FIG. 12 is an exemplary flow chart showing a process that is executed by a communication device to determine if a travel metric datagram should be transferred to another communication device, or transmitted to a carrier server.

FIG. 12 is a flowchart illustrating the algorithmic steps for randomizing data submission to obscure identity information in accordance with an embodiment of the disclosure. The receiving communication device 50, whether that be the user communication device 50 or the updating communication device 50, retrieves the next sampled travel metrics datagram 830 to be processed from a queue 840. A submission function is evaluated 842, and if the result is positive, then the sampled travel metrics datagram 830 is transmitted to the carrier server 852. In one embodiment of the disclosure, a random number generator is employed to generate a result, which is then compared to a threshold, to produce the desired probability distribution. Otherwise, the communication device 50 locates another communication device 50 in the ad hoc network 846 and transmits the sampled travel metrics datagram 830 to that communication device 848, 50. Once the sampled travel metrics datagram 830 has been processed, it is removed from the queue 852. Other schemes for generating a probability distribution and determining when to send the sampled travel metrics datagram 830 to the carrier server 10 will be apparent to one of ordinary skill in the art upon reading this disclosure and are to be considered within the scope of the present disclosure.

Figure 13:
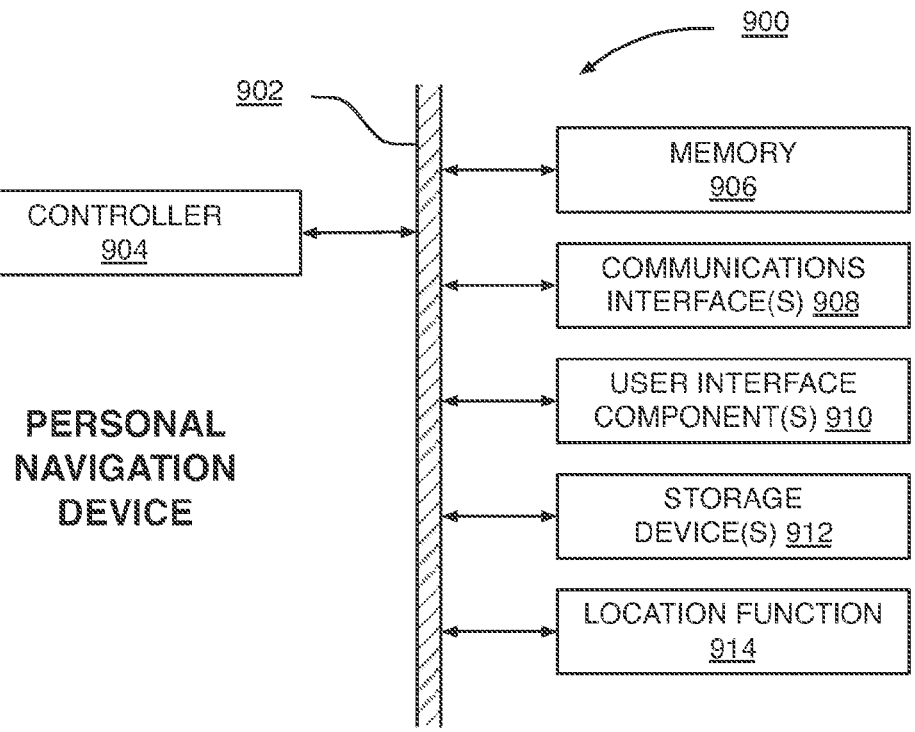
FIG. 13 is a block diagram of the personal navigation device of FIG. 1 according to one embodiment of the present disclosure.

FIG. 13 is a block diagram of a personal navigation device (PND) 900 (e.g., one or more PNDs 20 of FIG. 1) according to an embodiment of the present disclosure. As illustrated, PND 900 includes a controller 904 connected to memory 906, one or more communications interfaces 908, one or more user interface components 910, one or more storage devices 912, and a location function 914 by a bus 902 or similar mechanism. The controller 904 is a microprocessor, digital ASIC, FPGA, or the like. In this embodiment, the controller 904 is a microprocessor, and the application logic 22 is implemented in software and stored in the memory 906 for execution by the controller 904. In this embodiment, the location function 914 is a hardware component such as, for example, a GPS receiver. The communications interface 908 is a wireless communication interface that communicatively couples PND 900 to a communication device 50 (FIG. 1). For example, the communications interface 908 may be a local wireless interface such as a wireless interface operating according to one of the suite of IEEE 802.11 standards, bluetooth, or the like. The one or more user interface components 910 include, for example, a touchscreen, a display, one or more user input components (e.g., a keypad), a speaker, or the like, or any combination thereof. The storage device(s) 912 is a non-volatile memory used to store the map data 24, trip data 26, preferences 28, and the like.

PND 900 could be any type of global positioning satellite device, such as, an in-vehicle GPS device (e.g. Garmin Nuvi 260®, Tom-Tom®, Magellan®), a handheld GPS unit (e.g., Magellan Explorist 500®, Garmin Dakota 20®), a GPS device dedicated for training and fitness (e.g., Garmin Edge 705®, Polar Electro RX800®, Forerunner 405®), a GPS device for marine navigation (e.g., Lowrance GlobalMap 7300C HD®), an Aviation Portable GPS device (e.g., Lowrance Airmap 2000C®), and a built-in GPS navigation application for handheld computers and communication devices (e.g., Apple iTouch®, Apple iPad®, Palm Pilot®, Blackberry®, Droid®, Apple iPhone®, Motorola Moto Q®, Sprint Evo®).

Figure 14:
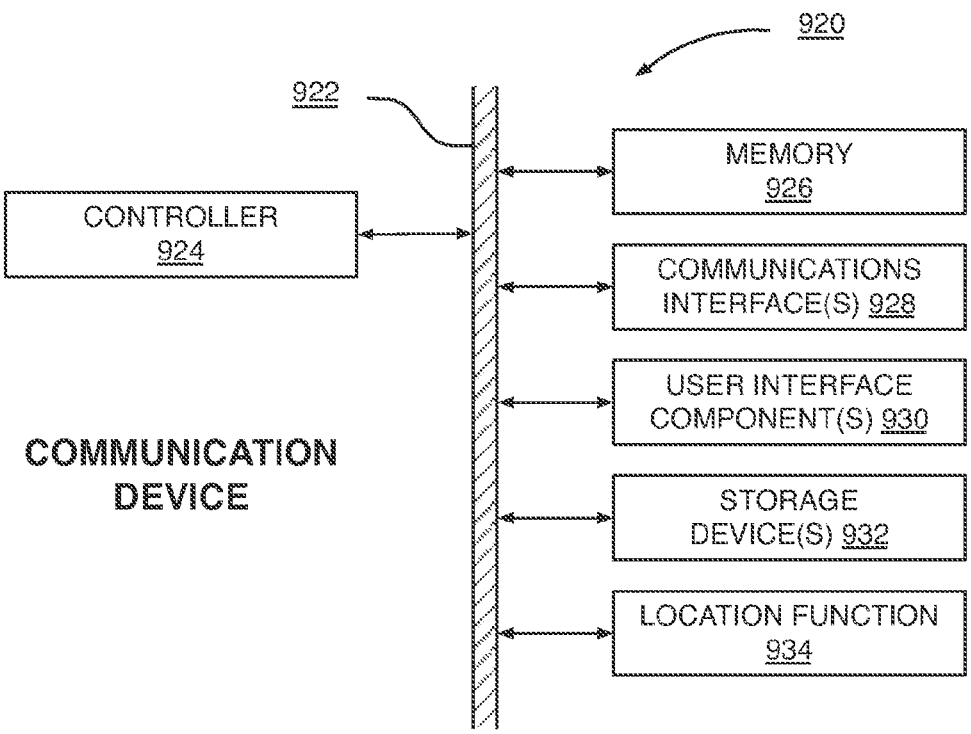
FIG. 14 is a block diagram of the communication device of FIG. 1 according to one embodiment of the present disclosure.

FIG. 14 is a block diagram of a communication device 920 (e.g., any of communication device 50-0 through 50-N of FIG. 1) according to an embodiment of the present disclosure. The communication device 920 may be a mobile phone (e.g., mobile telephone, cellular telephone, cell phone) or handheld computer. A "handheld computer" could be understood to be a relatively small wired, wireless or mobile computer, terminal or PDA ("personal digital assistant"), such as a Palm Pilot®, Pocket PC®, Blackberry®, Apple iPhone®, Apple iTouch®, Apple iPad®. The communication device 50 can be known as an updating communication device, user communication device, first communication device, or second communication device. An updating communication device may be, but is not limited to, a cellular communication device, operated by a callee, that receives or transmits availability information and location information from a carrier server (e.g., carrier server 10) or another communication device. A user communication device 50 may be, but is not limited to, a device operated by a caller, that receives or transmits availability information and location from the carrier server or another communication device 50. A "callee" includes, but is not limited to, an individual or entity that is being called or that may be called at some point in the future. A "caller" includes, but is not limited to, an individual or entity that places a call to the callee or another entity.

As illustrated, communication device 920 includes a controller 924 connected to a memory 926, one or more communications interfaces 928, one or more user interface components 930, one or more storage devices 932, and a location function 934 by a bus 922 or similar mechanism. The controller 924 is a microprocessor, digital ASIC, FPGA, or the like. In this embodiment, the controller 924 is a microprocessor, and the application logic 52 is implemented in software and stored in the memory 926 for execution by the controller 924. In this embodiment, the location function 934 is a hardware component such as, for example, a GPS receiver. The communications interface 928 includes a wireless communications interface that communicatively couples the communication device 920 to the network 30 of FIG. 1, and a wireless communication interface that connects the communication device 920 to one or more personal navigation devices 20. For example, the communications interface 928 may be a local wireless interface such as a wireless interface operating according to one of the suite of IEEE 802.11 standards, a mobile communications interface such as a cellular telecommunications interface, Bluetooth, or the like. The one or more user interface components 930 include, for example, a touchscreen, a display, one or more user input components e.g., a keypad, a speaker, or the like, or any combination thereof. The storage device(s) 932 is a non-volatile memory used to store the address book 54, preferences 56, and the like.

Figure 15:
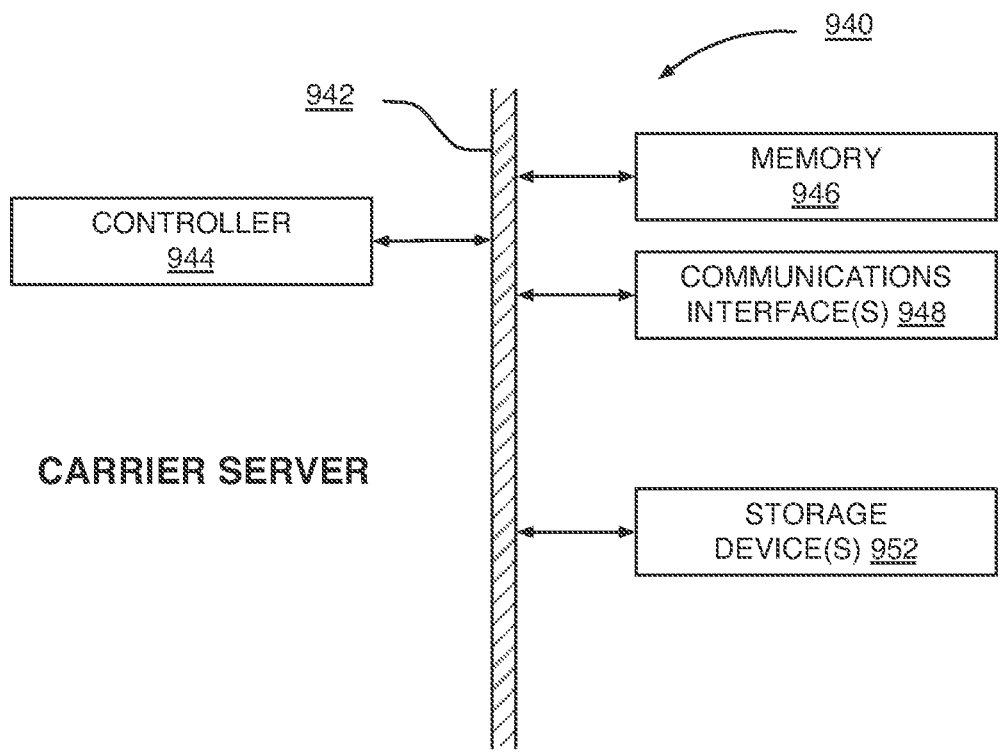
FIG. 15 is a block diagram of the carrier server of FIG. 1 according to one embodiment of the present disclosure.

FIG. 15 is a block diagram of a carrier server 940 (e.g., one or more carrier servers 10 of FIG. 1) according to an embodiment of the present disclosure. As illustrated, carrier server 940 includes a controller 944 connected to a memory 946, one or more secondary storage devices 952, and one or more communications interfaces 948 by a bus 942 or similar mechanism. The controller 944 is a microprocessor, digital Application Specific Integrated Circuit ASIC, Field Programmable Gate Array FPGA, or the like. In this embodiment, the controller 944 is a microprocessor, and the application logic 42 is implemented in software and stored in the memory 946 for execution by the controller 944. Further, the user accounts 12 may be implemented in the one or more secondary storage devices 952. The secondary storage devices 952 are digital data storage devices such as, for example, one or more hard disk drives. The communications interface 948 is a wired or wireless communication interface that communicatively couples the carrier server 940 to the network 30 of FIG. 1. For example, the communications interface 948 may be an Ethernet interface, local wireless interface such as a wireless interface operating according to one of the suite of IEEE 802.11 standards, or the like.

Figure 16:
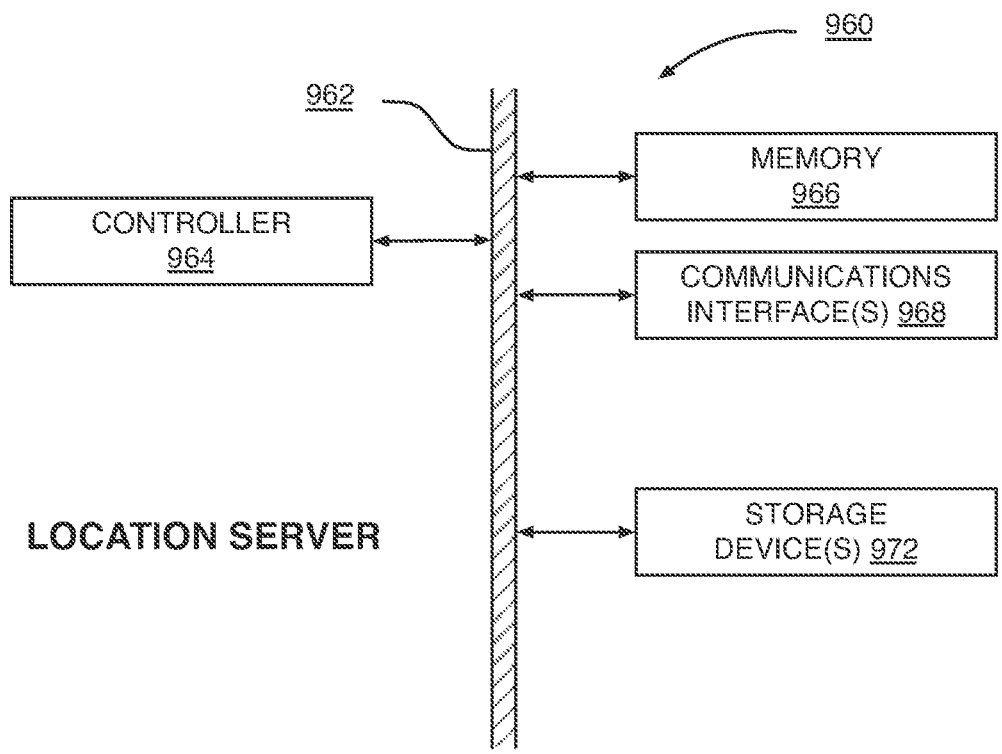
FIG. 16 is a block diagram of the location server of FIG. 1 according to one embodiment of the present disclosure.

FIG. 16 is a block diagram of a location server 960 (e.g., location server 40 of FIG. 1) according to an embodiment of the present disclosure. As illustrated, the location server 960 includes a controller 964 connected to a memory 966, one or more secondary storage devices 972, and one or more communications interfaces 968 by a bus 962 or similar mechanism. The controller 964 is a microprocessor, digital Application Specific Integrated Circuit ASIC, Field Programmable Gate Array FPGA, or the like. In this embodiment, the controller 964 is a microprocessor, and the application logic 42 is implemented in software and stored in the memory 966 for execution by the controller 964. Further, the coverage maps 47 and traffic statistics 48 may be implemented in the one or more secondary storage devices 972. The secondary storage devices 972 are digital data storage devices such as, for example, one or more hard disk drives. The communications interface 968 is a wired or wireless communication interface that communicatively couples the location server 960 to the network 30 of FIG. 1. For example, the communications interface 968 may be an Ethernet interface, local wireless interface such as a wireless interface operating according to one of the suite of IEEE 802.11 standards, or the like.

Accordingly, methods and systems have been disclosed for using cellular communication device 50 availability information to predict coverage overlap between callers. While various embodiments of the disclosure have been shown and described, it should be apparent that many variations and alternative embodiments could be implemented in accordance with the disclosure. It is understood, therefore, that the disclosure is not to be in any way limited except in accordance with the spirit of the appended claims and their equivalents.

What is claimed is:

1. A method for determining the availability of a communication device, comprising:
receiving, via a network, first availability information from a first communication device;

receiving, via the network, second availability information from a second communication device;

determining an estimate of common coverage by comparing said first availability information with said second availability information, wherein the estimate of common coverage is a predictor of the first and second communication devices' concurrent capability for communication;

determining a route change based upon said estimate of common coverage wherein said route change comprises an alternate trip route; and transmitting said estimate of common coverage to at least one of said first communication device and said second communication device.

2. The method of claim 1, wherein at least one of said first communication device and said second communication device is a mobile phone.

3. The method of claim 1, further comprising establishing a communication link between said first communication device and said second communication device contingent upon said estimate of common coverage.

4. The method of claim 1, wherein each of said first availability information and said second availability information comprises at least one selected from a group consisting of: distance information, directional information, battery life information, location information and signal strength information.

5. The method of claim 1, wherein at least one of said first availability information and said second availability information is displayed on at least one of said first communication device and said second communication device.

6. The method of claim 1, wherein said route change is transmitted to at least one of said first communication device and said second communication device.

7. The method of claim 1, wherein said route change is determined based on maximizing communication capabilities between the first communication device and the second communication device.

8. The method of claim 7, wherein said route change is determined based on a group consisting of: preference profile weighting coefficients, preference profile measurements, weighted preference measurements, sorted weighted preference measurements, quantized sorted weighted preference measurements, an alternate route matrix, a weighted alternate route matrix, a summed weighted alternate route matrix, and a sorted summed weighted alternate route matrix.

9. A method for determining the availability of a communication device comprising:

receiving first availability information from a carrier server, wherein said first availability information is associated with an updating communication device;

determining an estimate of common coverage by comparing said first availability information with second availability information, wherein said second availability information is associated with a user communication device and wherein the estimate of common coverage is a predictor of the first and second communication devices' concurrent capability for communication;

determining a route change based upon said estimate of common coverage wherein said route change comprises an alternate trip route; and establishing a communication link between said user communication device and said updating communication device contingent upon said estimate of common coverage.

10. The method of claim 9, further comprising effecting the alternate trip route.

11. The method of claim 10, wherein said alternate trip route comprises a plurality of waypoints.

12. The method of claim 9, wherein said route change is determined based on maximizing communication capabilities between the first communication device and the second communication device.

13. The method of claim 12, wherein said route change is determined based on a group consisting of: preference profile weighting coefficients, preference profile measurements, weighted preference measurements, sorted weighted preference measurements, quantized sorted weighted preference measurements, an alternate route matrix, a weighted alternate route matrix, a summed weighted alternate route matrix, and a sorted summed weighted alternate route matrix.

14. The method of claim 9, further comprising transmitting, via the network, said route change to said updating communication device.

15. The method of claim 9, wherein each of said first availability information and said second availability information comprises at least one selected from a group consisting of: distance information, directional information, battery life information, location information and signal strength information.

16. The method of claim 9, wherein at least one of said first availability information and said second availability information is displayed on at least one of said user communication device and said updating communication device.

17. A system for determining the availability of a communication device, comprising:

a communication interface adapted to communicatively couple the system to a network;

at least one processor;

and memory containing executable software by the at least one processor whereby the system is operative to:

receive, via the network, first availability information from a first communication device;

receive, via the network, second availability information from a second communication device;

determine an estimate of common coverage by comparing said first availability information with said second availability information, wherein the estimate of common coverage is a predictor of the first and second communication devices' concurrent capability for communication;

determining a route change based upon said estimate of common coverage wherein said route change comprises an alternate trip route; and transmit said estimate of common coverage to at least one of said first communication device and said second communication device.

18. A system for determining the availability of a communication device, comprising:

a communication interface adapted to communicatively couple the system to a network;

at least one processor;

and memory containing executable software by the at least one processor whereby the system is operative to:

receive, via the network, first availability information from a carrier server, wherein said first availability information is associated with an updating communication device;

determine an estimate of common coverage by comparing said first availability information with second availability information, wherein said second availability information is associated with a user communication device and wherein the estimate of common coverage is a predictor of the first and second communication devices' concurrent capability for communication;

determining a route change based upon said estimate of common coverage wherein said route change comprises an alternate trip route; and establish a communication link, over the network, between said user communication device and said updating communication device contingent upon said estimate of common coverage.

19. A non-transitory computer-readable medium embodied in an article of manufacture, comprising instructions for instructing a computer to:

receive, via a network, first availability information from a first communication device;

receive, via the network, second availability information from a second communication device;

determine an estimate of common coverage by comparing said first availability information with said second availability information, wherein the estimate of common coverage is a predictor of the first and second communication devices' concurrent capability for communication;

determining a route change based upon said estimate of common coverage wherein said route change comprises an alternate trip route; and transmit said estimate of common coverage to at least one of said first communication device and said second communication device.

20. A non-transitory computer-readable medium embodied in an article of manufacture, comprising instructions for instructing a computer to:

receive, via a network, first availability information from a carrier server, wherein said first availability information is associated with an updating communication device;

determine an estimate of common coverage by comparing said first availability information with second availability information, wherein said second availability information is associated with a user communication device and wherein the estimate of common coverage is a predictor of the first and second communication devices' concurrent capability for communication;

determining a route change based upon said estimate of common coverage wherein said route change comprises an alternate trip route; and establish a communication link, over the network, between said user communication device and said updating communication device contingent upon said estimate of common coverage.

* * * * *